UNITED STATES PATENT OFFICE.

JEHU BRAINERD AND W. H. BURRIDGE, OF CLEVELAND, OHIO.

IMPROVEMENT IN TANNING.

Specification forming part of Letters Patent No. 24,278, dated June 7, 1859.

*To all whom it may concern:*

Be it known that we, JEHU BRAINERD and WILLIAM H. BURRIDGE, of Cleveland, in the county of Cuyahoga and State of Ohio, have invented new and useful Improvements in the Preparation of Skins and Hides for Tanning and Tanning the Same into Leather; and we do hereby declare that the following is a full and complete description of the process and of the materials used therein.

Our invention relates to the employment of a preparation liquor or liquors in which skins and hides are to be prepared or treated after having been unhaired and bated, in order to fit them to receive more readily the tan, this step in the process being intermediate between the bate and handling in the tan or ooze, and which may be repeated in the manner hereinafter specified. By means of this preparation-liquor the tannin is more rapidly combined with the gelatine of the skin, very materially shortening the process, and producing a superior quality of leather. The skins or hides may be unhaired, freed from the lime, bated, and worked off upon the beam in the usually-practiced methods. At this stage of the process, instead of handling them in a solution of tannin, as in the common mode of proceeding, we handle them in a preparation-liquor for a day or more, according to the thickness of the hides. This preparation-liquor may be prepared in the following-named manner: Take two equal measures of soft water in separate vessels, and in one of them dissolve to saturation common salt, (NaCl.) The salt should remain considerably in excess undissolved. In the other measure of water dissolve alum, $(Al_2O_3.3SO_3:KO.SO_3+24HO,)$ to saturation. The alum should be previously pulverized, some of which should remain undissolved. The two solutions thus prepared may then be mixed in a vat of suitable dimensions, and for every one hundred gallons of the mixture there may be added from one-fifth to one-half of a pound of chloride of zinc, $(ZnCl,)$ previously dissolved in soft water. To this preparation-liquor we prefer to add about five pounds of gum-aloes, previously dissolved in soft water, thoroughly agitating the whole mixture; but hides may be treated with the saline solution without the aloes. The preparation-liquor can be renewed at any time by adding new liquor prepared as above stated; or the exhausted liquor can be used for making a new solution, instead of fresh water. The skins or hides, after they come from the bate, should be handled at least twice a day for from two to six days, according to their thickness. Constant agitation with a wheel will be advantageous. After the skins have become completely saturated, they should be placed upon a hurdle and allowed to thoroughly drain. They are then ready for the tan.

The tan-liquor may consist of a simple infusion of bark, or it may be prepared from any of the substances usually used for this purpose, the presence of tannic acid being essential to its preparation.

The skins or hides which have been treated in the preparation-liquor in the manner hereinbefore stated should be handled in the tan-liquor or ooze for three or more days, according to the thickness of the skins or hides. For calf-skins, three days will be sufficient for the first handling, if the temperature of the liquor is about 60° or 70° Fahrenheit. 100° will do no harm. Hides should remain in the tan-liquor some eight or ten days. When the skins or hides have exhausted the strength of the tan-liquor they should be placed upon a hurdle over the vat to drain, and when they have become thoroughly drained they should be returned to the preparation-liquor, which must have been recruited to its original strength, where they should remain for twenty-four hours, with one or two handlings during the time, and after being again thoroughly drained they are ready to be returned to a fresh or newly-recruited tan-liquor. Three days' handling in the second infusion of bark or ooze will usually suffice for calf-skins; but hides will require from thirty to forty days, and at least one (three in all) additional decoction or infusion of tannin. In all cases the length of time required to complete the process of tanning will depend in some degree upon the strength as well as the temperature of the tan-liquor; and it may be found advantageous to prevent acetic fermentation in the tan-liquor by the addition of common salt to the infusion of bark or other tan liquor. After the hides or skins are thoroughly tanned, they should be scoured and finished in the usual manner.

In the use of this improved process it may be remarked that the preparation-liquor causes the skins and hides more readily to absorb the tannin, and it also fixes or retains the latter when once absorbed. Consequently the tanning process advances more rapidly to completion.

Leather tanned in this manner is very soft, and yet compact and firm, and is easily rendered impervious to water by the usual modes of finishing.

In using the preparation-liquor our object is not to "plump" or "raise" the skins or hides, as has been done by the use of lime, the alkaline carbonates, or free mineral acids. These substances render the leather spongy, and sometimes stiff and brittle. They dissolve some portion of the substance or soluble gelatine of the hide, thus diminishing its weight ande rotting the leather, and they are especially injurious to thin skins; but our treatment and its effects are very different from all this. By our process none of the gelatine of the skin is dissolved out; but the whole substance of the hide is converted into leather, which is pliable, compact, and of full weight. Even leather that has been rendered hard and stiff by stale tan-liquors or excessive use of alkalies or mineral acids may be rendered pliable and otherwise improved in quality by treatment in our preparation-liquor. The aloes give a softness and pliability to the skin, and "sets the grain" and produces a uniform and delicate color in the leather.

We are aware that the chloride of zinc has been used alone, and that alum and common salt have been used, both separately and mixed; but in our process, as we use all of these together, we limit ourselves to their use substantially as herein described. We do not intend, however, to confine ourselves to the exact proportions specified, whether that proportion relates to the basic or haloid salts or to the aloes; but we may somewhat vary the proportions so long as we produce the same effect without departing from the leading features of our invention.

What we claim as our improvement, and desire to secure by Letters Patent of the United States, is—

The herein-described process of treating skins or hides in a preparation liquor or liquors, substantially as set forth, for the purposes described.

JEHU BRAINERD.
W. H. BURRIDGE.

Witnesses:
S. H. MATHER,
J. LEONARD.